Figure 1:
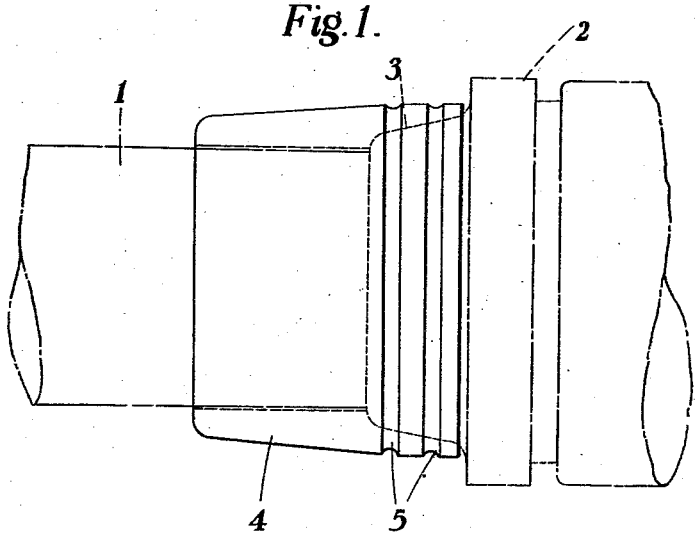

June 23, 1931.  A. E. WILSON  1,811,701
JOINTING OF LEAD OR LIKE PIPES OR SHEATHS
Filed July 23, 1930   2 Sheets-Sheet 1

INVENTOR
Alfred Edgar Wilson
BY
Byrnes, Stebbins, Parmelee & Blenko
ATTORNEYS

June 23, 1931. A. E. WILSON 1,811,701
JOINTING OF LEAD OR LIKE PIPES OR SHEATHS
Filed July 23, 1930 2 Sheets-Sheet 2

INVENTOR
Alfred Edgar Wilson
BY
Byrnes, Stebbins, Parmelee & Blenko
ATTORNEYS

Patented June 23, 1931

1,811,701

UNITED STATES PATENT OFFICE

ALFRED EDGAR WILSON, OF KENT, ENGLAND

JOINTING OF LEAD OR LIKE PIPES OR SHEATHS

Application filed July 23, 1930, Serial No. 469,998, and in Great Britain July 31, 1929.

This invention relates to the jointing of lead or like pipes or sheaths by the application of heat and pressure to a jointing sleeve either made of readily fusible metal or lined therewith and placed round the joint. Methods of and apparatus for making such joints are described in the specifications of British Patents Nos. 246,306 and 275,823. The invention is applicable not only to the case of making a joint between two pipes of similar metal, but also to cases where the joint has to be made between dissimilar metals, for instance, between a lead pipe and a gunmetal gland or sleeve. The invention applies not only to pipes as commonly understood, but also to pipes which form the sheaths of electric cables. It is to be understood that while the word "pipe" will be used for convenience in the following specification it will have, where the context admits, the wide meaning just indicated.

The present invention deals particularly with the case where a joint is to be made between two pipes or a pipe and some other form of tubular member, and where one of these differs from the other in such a way that different amounts of compression of the jointing sleeve are required on the two members to be joined. This difference may arise from a difference in diameter of the two tubular members, or from a difference in form, one member being, for instance, more accurately shaped than the other, or from a difference in the hardness or compressibility of the surfaces of the two members where the sleeve is required to unite with them. Under such circumstances it is difficult with the arrangements at present known to ensure that a satisfactory joint is made with both members. The sleeve will be forced tightly against one member before it makes sufficiently close engagement with the other and this tight fitting will support the sleeve so that it resists the further compression necessary to ensure a satisfactory joint with the other member.

An example will illustrate the difficulty: I take the case, shown in Figure 1 of the accompanying drawings, of a lead pipe 1 the end of which passes into or through a brass tube or gland 2, the end part 3 of which is to be jointed to the surface of the pipe. This end part 3 is machined and the jointing sleeve 4 is recessed so that it fits fairly closely on the end of the gland. In the case under consideration it is assumed that there is an appreciably greater clearance between the pipe 1 and the sleeve 4 than between the gland end 3 and the sleeve 4. The sleeve is of conical form and compression is exerted up it by forcing an external cone endwise over it, heat being applied to assist in the compression and the fusion of the surface of the sleeve where it comes in contact with the two members to be joined. Under such conditions after a small movement of the pressure cone has taken place the part of the sleeve 4 which lies over the end 3 of the gland is pressed tightly against it, and this practically prevents any further movement of the cone so that the compression cannot be continued to a sufficient extent to force the other portion of the sleeve into engagement with the pipe 1.

To overcome this difficulty I provide in accordance with the present invention an improved form of sleeve. This is one which has one end so modified that it offers less resistance to compression than the other end and the joint is made by placing the more compressible end of the sleeve over that one of the two members to be joined which will offer the greater obstacle to the compression. The weakening of the sleeve resistance to compression is brought about by removing portions of the sleeve at the end to be weakened so as to make it of non-uniform thickness there. This non-uniformity is not simply that produced by the conical shape but is due to sudden and local variations in thickness such as result from cutting grooves or flutes in one or both surfaces of the sleeve or forming holes or hollows within it. The grooves may be either circumferential or longitudinal. In the former case they may be provided either on the inside or outside the sleeve or in both these positions. If the grooves are longitudinal it is obviously not desirable to have them on the inside of the sleeve as they would then interfere with the production of a tight joint. In some cases it may be desirable to use a combination of longitudinal and circumferential grooves.

Figure 2:
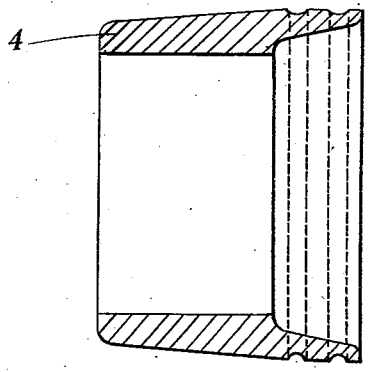
Figure 3:
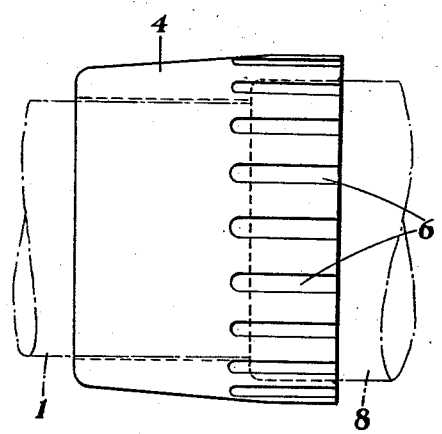
Figure 4:
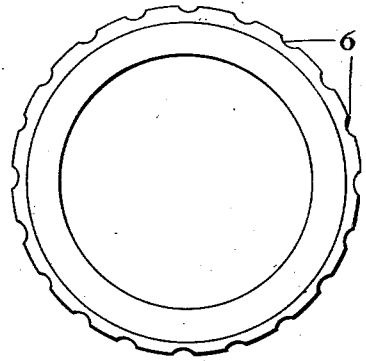
Figure 5:
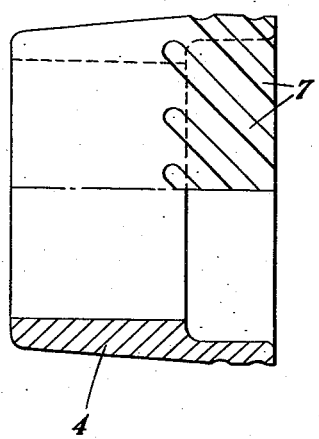
Figure 6:
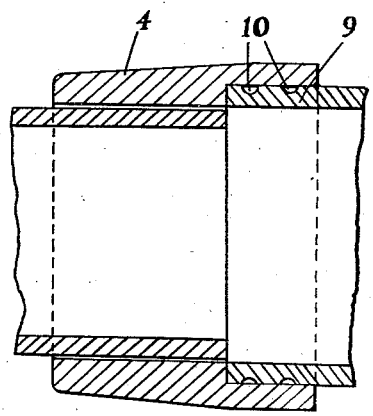

Examples of the invention will be described by reference to the accompanying drawings in which Figure 1 shows in side elevation and
Figure 2 in section one form of jointing sleeve,
Figure 3 shows in side elevation and
Figure 4 in end elevation another form of sleeve,
Figure 5 shows in side elevation and in section a third form of sleeve and
Figure 6 shows a modified form of the invention. In Figures 1 and 3 the parts to be joined together by the sleeve are shown in broken lines. In Figure 6 these parts are shown in full lines.

Figure 1 has already been referred to for the purpose of indicating the difficulties with which the invention is intended to deal. This drawing also shows how the difficulties are overcome by means of weakening the right hand end of the sleeve 4 by circumferential grooves 5. This weakened end is placed over the end 3 of the brass gland and when the sleeve has been compressed so as to fit tightly on this gland the further compression causes the metal of the right hand end of the sleeve to flow so as to more or less completely fill the groove 5. This will offer comparatively small resistance to the compression so that it can continue until the non-weakened part, that is the left hand end of the sleeve 4, has made contact with the pipe 1.

In the example illustrated in Figures 3 and 4 the right hand end of the sleeve 4 is weakened by longitudinal grooves 6. In the example shown in Figure 5 the grooves are arranged helically as indicated at 7.

In the example given in Figure 3 the case of a joint between two pipes is illustrated. The pipe 1 at the left hand side of the joint is of soft metal, such as a lead pipe where accurate shaping and dimensions cannot be expected and accordingly an appreciable clearance must be allowed. The pipe 8 on the right hand side is of hard metal, such as brass, which is made accurately to dimensions and accordingly requires less clearance.

It will be recognized that the difficulty which this invention is intended to deal with may arise not only from differences between the members to be jointed, but may also be due to differences in the two ends of a sleeve which cause it to engage tightly on one of the members to be jointed before the other.

In some cases particularly those of standardized joints it may be possible to utilize a modification of the invention in which the grooves or other recesses are formed in one of the members to be jointed instead of in the jointing sleeve. An example of this modification is shown in Figure 6. In this the sleeve 4 is not weakened but the end 9 of the pipe or gland of hard metal which fits in the right hand end of the sleeve is provided with circumferential grooves 10 which afford space for the flow of the metal of the sleeve in the course of compression.

What I claim as my invention and desire to secure by Letters Patent is:—

1. The method of jointing pipes (or other equivalent members), one of which by reason of its material, form or dimensions offers greater resistance to compression than the other, which comprises taking a sleeve of compressible metal, fitting it over the ends of the two pipes to be joined, arranging that at one end of the sleeve there is less resistance to the compression than at the other end, owing to the provision of spaces into which the metal can flow, the easier flow being at the end where the pipe offers the greater resistance to compression, and applying compression to the outside of the sleeve to compress it as a whole into contact with the ends of the two pipes.

2. For use in a method of jointing pipes (or equivalent members) as set out in claim 1, a sleeve of compressible metal made weaker against compression at one end than at the other by the provision of grooves in one surface at that end.

In testimony whereof I affix my signature.

ALFRED EDGAR WILSON.